Figure 1:
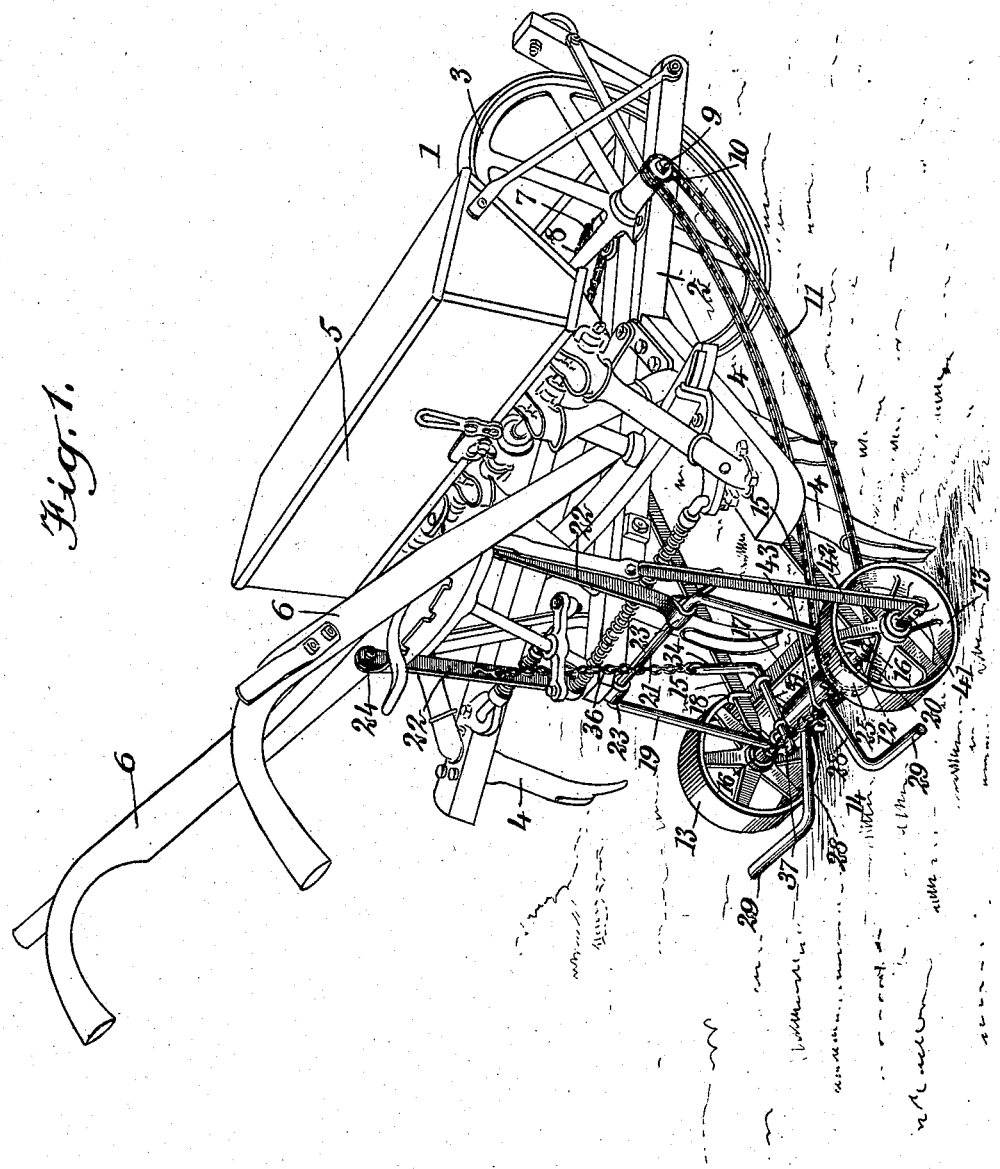

No. 866,993. PATENTED SEPT. 24, 1907.
E. B. WINSHIP.
PLANTER.
APPLICATION FILED JUNE 18, 1907.

2 SHEETS—SHEET 1.

WITNESSES
Geo. W. Naylor.
John K. Brackengel

INVENTOR
Earl B. Winship
BY Munn & Co.
ATTORNEYS

No. 866,993. PATENTED SEPT. 24, 1907.
E. B. WINSHIP.
PLANTER.
APPLICATION FILED JUNE 18, 1907.
2 SHEETS—SHEET 2.
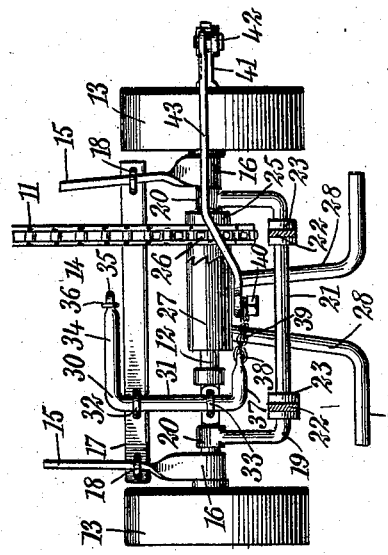
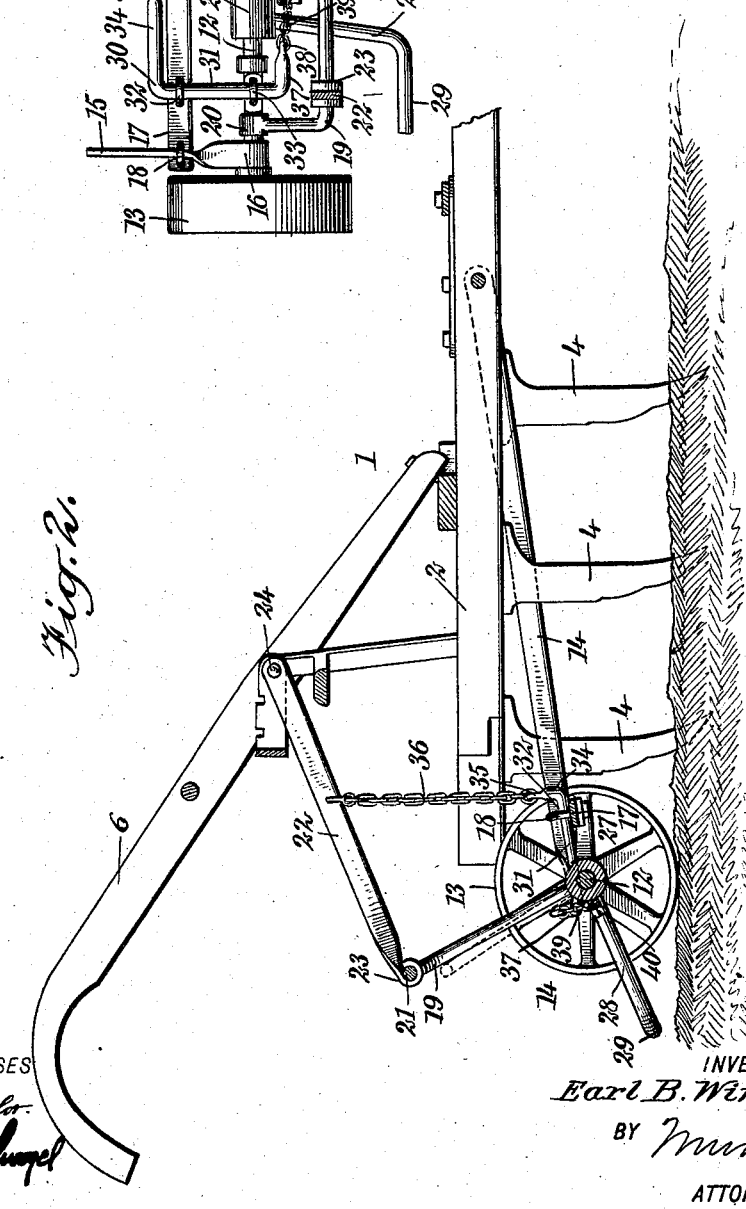
WITNESSES
INVENTOR
Earl B. Winship
BY
ATTORNEYS.

UNITED STATES PATENT OFFICE.

EARL B. WINSHIP, OF RUSHVILLE, INDIANA.

PLANTER.

No. 866,993.     Specification of Letters Patent.     Patented Sept. 24, 1907.

Application filed June 18, 1907. Serial No. 379,637.

*To all whom it may concern:*

Be it known that I, EARL B. WINSHIP, a citizen of the United States, and a resident of Rushville, in the county of Rush and State of Indiana, have invented a new and Improved Planter, of which the following is a full, clear, and exact description.

This invention relates to planters, and more particularly that class of planters commonly characterized as grain drills.
The object of the invention is to provide a simple, strong and efficient planter having a frame provided with drill teeth and supported upon a wheel, and having means for automatically elevating the frame at predetermined intervals, in order to free the drill teeth from weeds and the like.

A further object of the invention is to provide a planter having a frame presenting drill teeth and carried upon a supporting wheel, and provided with a truck connected by means of a toggle to the frame, the planter having means operated by the supporting wheel, for automatically and periodically elevating the frame to raise the drill teeth above the ground in order to allow the accumulated weeds and the like caught thereby, to fall from the teeth.
The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which Figure 1 is a perspective view of a planter showing my invention applied thereto; Fig. 2 is a longitudinal, vertical section; and Fig. 3 is a plan view of a part of the planter showing details of my invention.

Before proceeding to a more detailed explanation of my invention it should be understood that in planters such as grain drills, it is customary to employ hollow drill teeth connected with a grain hopper from which the grain is automatically fed to the drill teeth. As the planter travels over the ground the drill teeth form furrows into which the grain is dropped at given intervals, by the hollow drill teeth themselves. In traveling along, the drill teeth accumulate weeds, stalks, twigs and the like and it is therefore necessary periodically to elevate the end of the drill to permit the accumulations to fall from the teeth. Even in small planters it requires considerable labor to raise the weight of the device every now and then by means of the guiding handles, and this operation entails unnecessary work upon the operator of the planter. To obviate this feature in the operation of planters such as grain drills I provide means for automatically, periodically elevating the device to raise the teeth above the ground in order to permit the accumulation of weeds and the like to fall from the teeth; the automatic means for accomplishing this purpose are operated by the planter itself, the power necessary being provided by a supporting wheel which travels along the ground, and being transmitted to suitable mechanism by means of a chain and sprockets. In addition, I provide means for holding the frame of the planter in an elevated position to support the drill teeth in a raised position so that the planter can be moved from place to place in an inoperative condition.

Referring more particularly to the drawings, 1 represents a planter or grain drill of the usual type, having a frame 2 carried near the forward end, upon a suitable supporting wheel 3. The planter has drill teeth 4 suitably connected with a grain hopper 5 and carried upon the frame 2, the parts of which are laterally adjustable so that the width of the drills or furrows can be suitably regulated. The frame has guiding handles 6 projecting rearwardly, by means of which the device can be controlled. The supporting wheel 3 has the axle 9 laterally extended beyond the sides of the frame 2 and provided with a sprocket 7 which is connected by means of a suitable chain 8 with the seed discharging mechanism of the planter. At the opposite end, the axle 9 has a second sprocket 10 which is connected by means of a chain 11 with the automatic elevating mechanism. I provide a truck 14 comprising, preferably, an axle 12 having wheels 13 near the ends. The wheels 13 can be advantageously fashioned from material such as cast-iron and should have broad tires, as is usual in agricultural machinery destined to travel upon comparatively soft ground. The truck 14 is connected by means of the arms 15 with the frame of the planter and is securely held in position with regard to the planter by means of the arms, the ends 16 of which are twisted laterally and formed into bearings which are mounted upon the axle 12. A cross-bar 17 connects the arms 15 near the axle 12 and is held securely in position by means of U-bolts 18. The U-shaped member 19 having integral eyes 20 at the extremities, is pivotally mounted by means of the latter on the axle 12, and is free to swing about the same. The cross-member 21 of the member 19 is substantially parallel to the axle and carries links 22 pivoted thereon by means of bearing sleeves 23 formed at the ends of the links. The opposite ends of the links are pivotally mounted upon the handles 6 of the planter by means of pivot bolts 24.

Loosely mounted upon the axle 12 is a clutch section 25 having a rigid sprocket 26 upon which is arranged the chain 11; thus the clutch section 25 is operated from the supporting wheel 3 through the sprocket-chain 11 when the planter moves along the ground. A second clutch section 27 is loosely mounted upon the axle 12 adjacent to the clutch section 25. The clutch sections, at the adjacent ends, have oppositely disposed teeth or serrations adapted to engage and hold the sections together when one of the same is turned in one direction; thus when the section 25 is turned by means of the chain 11 it engages the clutch section 27 and turns the latter in the same direction, as a movement of the first section due to the chain 11. The clutch section 27 has extensions or arms 28 presenting lateral, outwardly disposed ends 29 adapted to engage the U-shaped member 19 when the clutch section 27 is rotated, and thereby to extend the toggle formed by the member 23 and the links 22, to elevate the frame of the planter.

A releasing member 30 has a shank 31 pivotally mounted in eyes 32 and 33 carried respectively by the cross-bar 17 and the axle 12. The releasing member 30 has a laterally disposed arm 34 presenting an eye 35 which is connected by means of a chain 36 to a link 22. At the opposite end, the releasing member has a similar but shorter arm 37 having an eye 38 and connected by means of a chain 39 with a stud 40 carried by the clutch section 27. At one end, the axle 12 has an extending fork 41 at which is pivotally mounted a hand lever 42 connected by means of a link 43 with the stud 40 of the clutch section 27.

As the planter moves along the ground, the rotation of the supporting wheel 3 is transmitted by means of the chain 11 to the clutch section 25, which in turning forward grips the clutch section 27 and turns the latter, bringing the laterally-disposed ends 29 of the arms 28 into operative engagement with the sides of the U-member 19. The arms 28 thus move the toggle and elevate the frame of the planter, swinging the frame about the axle of the supporting wheel 3 and thereby raising the drill teeth above the ground to permit the accumulated weeds and the like to fall therefrom. As the toggle is extended, the link 22 to which the chain 36 is attached, draws the latter upwardly and swings the releasing member 30 pivotally within the eyes 32 and 33, thereby moving the arm 37 away from the clutch section 27 and drawing the latter by means of the chains 39, out of engagement with the clutch section 25. As soon as the clutch sections are no longer operatively engaged, the weight of the planter causes the elevated parts to return to the normal position with the drill teeth engaging the ground. If it is desired to return the planter to the normal position before it has reached its extreme elevation, the clutch section can be disengaged by means of the hand lever 42.

If is is desired to hold the planter in an elevated and inoperative position, the toggle can be fully extended with the links and the sides of the U-shaped member 19 in alinement, so that the weight of the elevated planter can not act to return the parts to the normal position. The inoperative position is shown most clearly in Fig. 1. It may be necessary to release the chain 36 from engagement with the link 32, to permit the clutch sections to remain in engagement until the alined position of the links and sides of the U-member is reached.

Having thus described my invention, I claim as new and desire to secure by Letters Patent:—

1. In a planter, the combination, with a frame having drill teeth, and a supporting wheel carrying said frame near one end thereof, of means operated by said wheel for periodically elevating said frame at the end remote from said wheel, and means controlled by said first means, for releasing said frame from an elevated position.

2. In a planter, the combination, with a frame having drill teeth, and a supporting wheel carrying said frame near one end thereof, of means operated by said wheel for periodically operating said frame at the end remote from said wheel, and automatic means for controlling said elevating means, to permit the frame to be returned to a normal position.

3. In a planter, the combination, with a frame having drill teeth, and a supporting wheel carrying said frame near one end thereof, of automatic means operated by said wheel for elevating said frame at predetermined intervals at the end remote from said wheel, and means controlled by said elevating means for releasing said frame from an elevated position when said frame has been raised a predetermined distance.

4. In a planter, the combination, with a frame having drill teeth, and a supporting wheel carrying said frame near one end thereof, of a truck, a toggle connecting said frame and said truck, and means for periodically extending said toggle to elevate said frame.

5. In a planter having drill teeth, in combination, wheels, an extensible frame supported on said wheels and adapted to raise said drill teeth, and automatic means for periodically operating said extensible frame.

6. In a planter, having a supporting wheel and a plurality of drill teeth, in combination with a second wheel, means supported by said second wheel for periodically raising said drill teeth.

7. In a planter, having a supporting wheel and a plurality of drill teeth, in combination with a second wheel, automatic means supported by said second wheel and operated by said supporting wheel for periodically raising said drill teeth.

8. In a planter, having a supporting wheel and a plurality of drill teeth, in combination with a second wheel, automatic means supported by said second wheel and operated by said supporting wheel, for periodically raising said drill teeth, and automatic means for releasing said raising means.

9. In a planter, the combination, with a frame having drill teeth, and a supporting wheel carrying said frame near one end thereof, of a truck, a toggle connecting said frame and said truck, automatic means for periodically extending said toggle to elevate said frame, and automatic means for releasing said extending means.

10. In a planter, the combination, with a frame having drill teeth, and a supporting wheel carrying said frame, of a truck, a toggle connecting said frame and said truck, automatic means controlled by said supporting wheel for periodically extending said toggle to elevate said frame, automatic means for releasing said extending means, and independent means for manually releasing said extending means.

11. In a planter, a frame having drill teeth, a supporting wheel carrying said frame, a truck, a toggle connecting said frame and said truck, a pivoted arm adapted operatively to engage said toggle to extend the same, and means operated by said supporting wheel, for controlling said arm.

12. In a planter, the combination, with a frame having drill teeth, and a supporting wheel carrying said frame, of a truck, a toggle connecting said frame and said truck, automatic means controlled by said supporting wheel for periodically extending said toggle to elevate said frame, automatic means for releasing said extending means, independent means for manually releasing said extending means, and automatic means controlled by the movement of said toggle, for releasing said arm.

13. In a planter, a frame having drill teeth, a supporting wheel carrying said frame, a truck having an axle, a toggle connecting said axle and said frame, a pivoted arm mounted on said axle and adapted operatively to engage said toggle to extend the same, means operated by said supporting wheel for swinging said arm into engagement with said toggle, and means controlled by the movement of said toggle, for releasing said arm.

14. In a planter, a frame having drill teeth, a supporting wheel carrying said frame, a truck having an axle, a toggle connecting said axle and said frame, a clutch section rotatably mounted upon said axle and having an arm adapted to engage said toggle, a second clutch section rotatably mounted upon said axle and adapted operatively to engage said first clutch section, means for operating said second clutch section from said supporting wheel, and means controlled by the movement of said toggle, for disengaging said clutch sections.

15. In a planter, a frame having drill teeth, a supporting wheel carrying said frame, a truck having an axle, a toggle connecting said frame and said axle, a clutch section rotatably mounted upon said axle and free to move longitudinally thereof, said clutch section having an arm adapted operatively to engage said toggle to extend the same, a second clutch section rotatably mounted upon said axle and adapted operatively to engage said first clutch section when said second clutch section is rotated in one direction, said second clutch section having a sprocket, a second sprocket rigid with said supporting wheel, a flexible driving member operatively connecting said sprockets, and a releasing member secured to said toggle and to said first clutch section, and adapted to move said first clutch section longitudinally of said axle when said toggle is operated, to disengage said clutch sections.

16. In a planter, a frame having drill teeth, a supporting wheel carrying said frame, a truck having an axle, a toggle connecting said axle and said frame, a clutch section rotatably mounted upon said axle and free to move longitudinally thereof, said clutch section having an arm adapted operatively to engage said toggle to extend the same, a second clutch section rotatably mounted upon said axle and adapted operatively to engage said first clutch section, when said second clutch section is rotated in one direction, said second clutch section having a sprocket, a second sprocket rigid with said supporting wheel, a flexible driving member operatively connecting said sprockets, a pivoted releasing member having arms, one of said arms being connected with said toggle, another of said arms being connected with said first clutch section whereby said first clutch section is moved longitudinally of said axle from engagement with said second clutch section, through the movement of said toggle, and means for manually disengaging said clutch sections.

In testimony whereof I have signed my name to this specification in the presence of two subscribing witnesses.

EARL B. WINSHIP.

Witnesses:
 ALBERT L. WINSHIP,
 WALTER C. NEWHOUSE.